United States Patent [19]

Hafle

[11] Patent Number: 5,017,772

[45] Date of Patent: May 21, 1991

[54] FIBER OPTIC PROBE SENSOR FOR MEASURING TARGET DISPLACEMENT

[75] Inventor: Ralph S. Hafle, Benton, Ark.

[73] Assignee: BEI Electronics, Inc., San Francisco, Calif.

[21] Appl. No.: 358,831

[22] Filed: May 30, 1989

[51] Int. Cl.$^5$ .............................................. H01J 5/16
[52] U.S. Cl. ........................... 250/227.21; 250/227.28
[58] Field of Search ...................... 250/227.28, 227.29, 250/227.11, 561, 231.19, 227.14, 227.21; 350/96.29; 356/4, 5, 1

[56] References Cited

U.S. PATENT DOCUMENTS

| | | |
|---|---|---|
| 3,327,584 | 6/1967 | Kissinger . |
| 3,503,116 | 3/1970 | Strack . |
| 3,771,873 | 11/1973 | Tourret ............................ 250/227.28 |
| 3,778,157 | 12/1973 | Brelot et al. ...................... 250/227.28 |
| 3,792,928 | 2/1974 | Poilleux ..................................... 356/4 |
| 3,814,081 | 6/1974 | Mori . |
| 3,940,608 | 2/1976 | Kissinger . |
| 4,070,116 | 1/1978 | Frosch . |
| 4,141,624 | 2/1979 | Siegmund . |
| 4,196,629 | 4/1980 | Philips . |
| 4,247,764 | 1/1981 | Kissinger . |
| 4,254,331 | 3/1981 | Dorman . |
| 4,488,813 | 12/1984 | Kissinger . |
| 4,601,537 | 7/1986 | Saccocio . |
| 4,674,882 | 6/1987 | Dorman . |
| 4,692,611 | 9/1987 | Hoogenboom . |
| 4,694,160 | 9/1987 | Hoogenboom . |
| 4,694,474 | 9/1987 | Dorman . |
| 4,701,610 | 10/1987 | Hoogenboom . |
| 4,701,611 | 10/1987 | Kissinger . |
| 4,711,577 | 12/1987 | Hull-Allen . |
| 4,719,341 | 1/1988 | Hoogenboom . |
| 4,751,381 | 6/1988 | Dorman . |
| 4,758,065 | 7/1988 | Dorman . |
| 4,799,751 | 1/1989 | Tekippe ......................... 250/227.28 |
| 4,805,630 | 2/1989 | Storey ........................... 250/231.19 |

OTHER PUBLICATIONS

Kist, Rainer, SPIE vol. 1011 Fiber Optic Sensors III (1988), pp. 81-119.

Primary Examiner—David C. Nelms
Attorney, Agent, or Firm—Limbach, Limbach & Sutton

[57] ABSTRACT

A fiber optic probe sensor for accurate measurement of displacement of a target over very small distances is disclosed. The probe sensor is comprised of plurality of light emitting fibers exclusively occupying a central region and connected to a light source for illuminating the target; a first and second plurality of light receiving fibers arrayed in two concentric regions exterior to and at two different distances from the central region, and means for measuring reflected light received from the target and for generating an output proportional to the light received and independent of target reflectivity or light source variation.

25 Claims, 9 Drawing Sheets

FIBER OPTIC PROBE SENSOR FOR MEASURING TARGET DISPLACEMENT

FIELD OF THE INVENTION

The present invention relates generally to the use of a light generating fiber optic apparatus to measure displacement of a target over very small incremental changes in distance. More particularly, it relates to an apparatus and method for measuring target displacement that is independent of variations in target reflectivity and light source.

BACKGROUND OF THE INVENTION

The use of reflected light received by optical fibers to measure displacement of a target is well known. Known probes generally comprise a bundle of optical fibers some of which transmit light to a target. A portion of the light which strikes the target is reflected back to the probe. The reflected light is received by and communicated along other optical fibers in the probe to a transducer which then generates an electrical signal proportional to the light received. As the target distance increases, the intensity of reflected light decreases. Thus, changes in the signal output of the light sensor can serve as a direct measure of changes in target distance. Typical examples of such sensors are disclosed in U.S. Pat. Nos. 3,327,584; 3,940,608; 4,247,764; 4,694,160; and 4,701,611. Unfortunately, measurement of displacement based upon changes in absolute light intensity greatly impairs the usefulness and sensitivity of such known probes. First, different targets will have different types of surfaces with different reflectivities, thereby necessitating frequent recalibration. Second, the light source itself may not always remain constant, but rather may often displays short-term variance resulting from variation the power supply. In addition, light sources frequently exhibit a decrease in intensity over time. Such changes require either frequent recalibration or the addition of costly circuitry and/or light sources to insure that the amount of light initially transmitted remains nearly constant. Finally, crosstalk between the light emitting and light receiving fibers in mixed bundles considerably reduces the resolving power of the apparatus. Although many modifications have been proposed to overcome these problems, there has been little improvement.

More recently, U.S. Pat. No. 4,701,610 described a fiber optic probe in which some of the light receiving fibers are segregated from a mixed bundle of light emitting and light receiving fibers. This provides two measures of reflectivity, one based on the segregated receiving fibers and one based on the receiving fibers which remain intermixed with the light emitting fibers. These two signals can then be processed to provide an output which is somewhat independent of changes in target reflectivity. Although this probe suffers from fewer of the problems encountered with reflectivity dependent probes, many difficulties remain. Crosstalk between the light emitting and light receiving fibers of the mixed bundle is particularly problematic, considerably reducing the probe's capacity for resolution. Furthermore, having a bundle of mixed light emitting and light receiving fibers substantially decreases the linearity of the final output signal, thereby introducing error and decreasing the range of distance through which the probe can effect an accurate measurement. Thus, there exists a need for a fiber optic probe which can determine the displacement of a target accurately over very small changes is distance, and which will provide a measurement which is substantially independent of target reflectivity and source illumination variation.

SUMMARY OF THE INVENTION

A primary object of the invention is to provide a means for accurately determining the distance to a target which is not affected by target reflectivity or variations in source illumination.

Another object of the invention is to provide a system which minimizes measurement error by increasing the linearity of the output generated.

A further object of the invention is to increase the sensitivity of the system so that very minute changes in displacement can be measured.

Yet another object of the invention is to increase the sensitivity of the system so that measurements can be made using very low levels of emitted light.

A fiber optic apparatus of the present invention achieves these objectives by providing an optical probe in which a plurality of light emitting fibers exclusively occupy a first region, a plurality of light receiving fibers exclusively occupy a second region spaced apart from the first region by a distance $D_1$ and another plurality of light receiving fibers exclusively occupy a third region, spaced apart from the first region by a distance $D_2$, wherein $D_1$ is never equal to $D_2$. Light is emitted and reflected off the target. The reflected light is differentially received by each of the pluralities of light receiving fibers and is separately conducted to a means for generating an output based upon rationing the light intensities received by the two zones of light receiving fibers. The output signal so generated is substantially independent of changes in, target reflectivity and of variation in the light source.

DETAILED DESCRIPTION OF THE INVENTION

Figure 1:
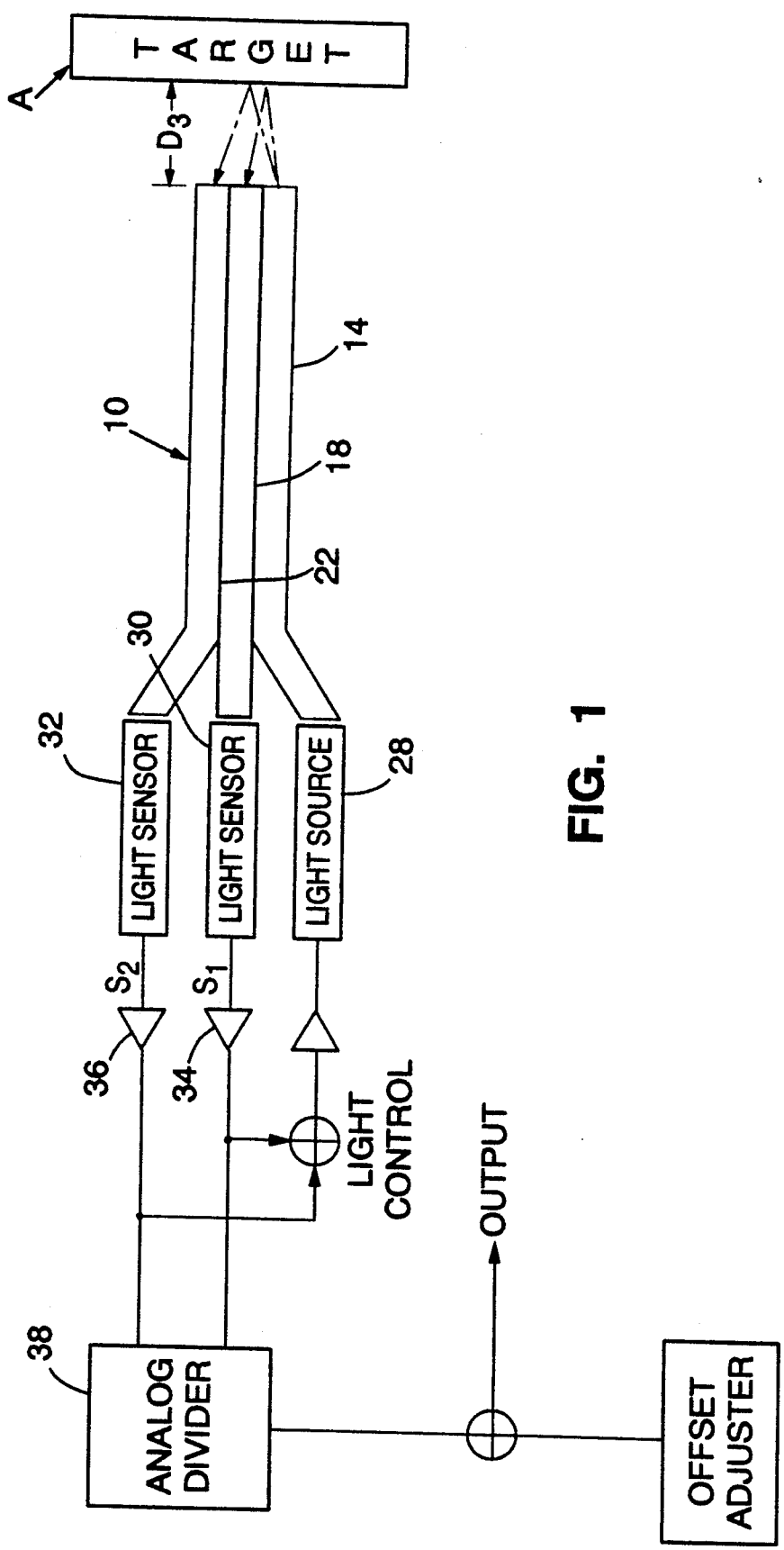
FIG. 1 shows a conceptual block diagram of the elements of the fiber optic apparatus of the present invention.
Figure 2:
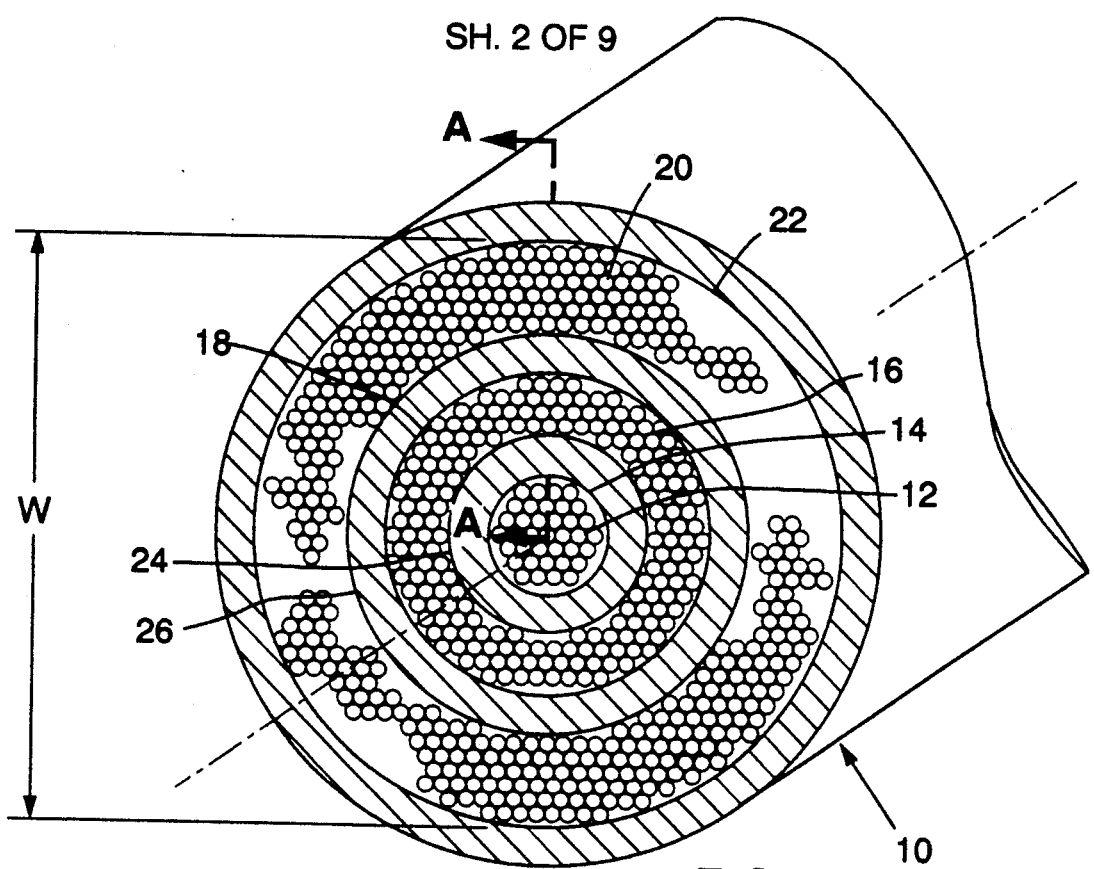
FIG. 2 shows a cross-sectional end-view of the preferred embodiment of the optical probe of the present invention.

Referring now to FIGS. 1 & 2, the fiber optic probe 10 of the present invention will now be described. In the preferred embodiment, the probe 10 is divided into plurality of light emitting fibers 12 occupying a central region 14, a first plurality of light receiving fibers 16 occupying a first region 18 exterior to and concentric about the central region 14 and a second plurality of light receiving fibers 20 occupying a second region 22 exterior to and concentric about the first exterior region 18. The first exterior region 18 lies at a distance $D_1$ from the center of the central; region 14 while the second exterior region 22 lies at a distance $D_2$ from the center of the central region 14. For the sake of clarity, the concentric disposition of the first and second exterior regions 18 and 22 is not shown in the block diagram of FIG 1. Ferrule 24 separates and blocks passage of light between the light emitting fibers 12 and the first plurality of light receiving fibers 16, while ferrule 26 separates and blocks light transfer between the first plurality of light receiving fibers 16 and the second plurality of light receiving fibers 20. Alternative spatial arrangements of light emitting and light receiving fibers are suitable, so long as the light emitting and light receiving fibers are not mixed substantially within the same region and so long as the radial positions of the two regions of light receiving fibers are different from one another relative to the radial position of the region of light emitting fibers.

The materials, production and finishing of the optical fibers are well known in the art. Such fibers may serve to either emit to or receive light from the target. It is preferable that the fibers be formed to have a diameter as narrow as possible and still be commercially feasible to produce. If large diameter fibers are used, the number of fibers per emitting or receiving zone is small. As a result, the large fibers do not completely fill the space between the ferrules but rather leave randomly positioned voids in the emitting and receiving areas. Such voids alter the ability of the cable to emit and receive light and therefore affect the ability to measure gap distances. Fibers as small as 0.2 mils can be used, however 1.0 mil is preferred since fibers of such diameter are easier to work with and since very small fibers tend to cut down on light transmission within the cable. The ferrules may be fabricated from any resilient opaque material such as metal, although stainless steel is preferred because it is corrosion resistant and because the temperature coefficient of expansion is closely matched to that of glass fibers.

With regard to the physical dimensions of the probe 10, the length of the optical fibers are not limiting. Thus, the circuitry of the apparatus which processes and generates the output may be at any convenient distance from the end of the probe 10. The diameter of probe 10, however, does affect the position of the probe 10 relative to target A. It has been experimentally determined that in order to preserve the measuring sensitivity and accuracy of the apparatus, the gross distance $D_3$ between the end of the probe 10 and target A should be substantially equivalent to the diameter W of the probe as measured between points taken along the outermost periphery of optical fibers. For example, a probe having a diameter of one inch should be positioned at a distance of one inch from the target.

As shown in FIG. 1, the plurality of light emitting fibers are connected to a light source 28, while the first plurality of receiving fibers 16 is connected to a first light sensor 30 and the second plurality of light receiving fibers 22 is connected to a second light sensor 32. The light sensors 30 and 32, which may be any type of known transducer capable of generating an electrical signal in response to exposure to light, are in turn connected to signal conditioners 34 and 36 and ultimately to an analog divider 38.

In the operation of the invention, light produced by the light source 28 is carried through and passes out of the light emitting fibers 12 and strikes the target A. Some of this emitted light is reflected back from the target A onto the first 16 and second 20 plurality of light receiving fibers, passing to the light sensors 30 & 32. In response to the light received from the first plurality of light receiving fibers 16, the sensor 30 generates a signal $S_1$. In response to the light received from the second plurality of light receiving fibers 20, the sensor 32 generates a signal $S_2$. These signals pass through signal conditioners 34 & 36, which amplify the signals, and ultimately to the analog divider 38. The analog divider 38 may be a circuit of any design well known in the art which is capable of generating an output as a quotient of the values of the received signals $S_1$ & $S_2$. It is preferred that the output be derived from the expression:

$$O = S_2/S_1$$

Figure 3:
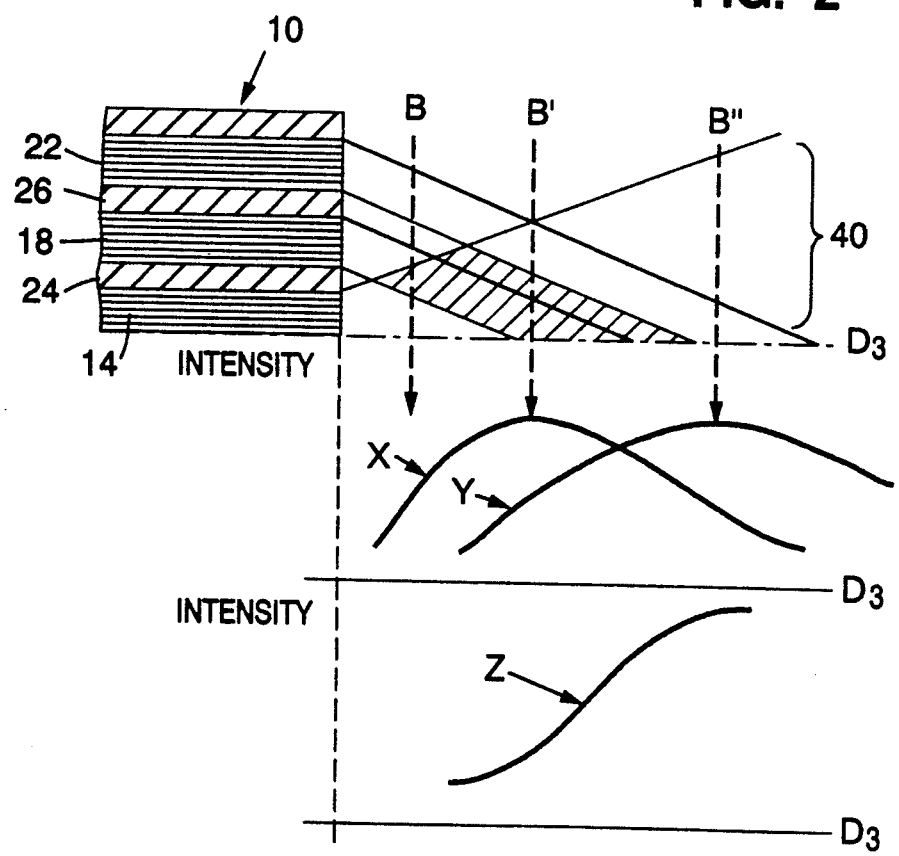
FIG. 3 shows the geometry of reflectance from a target for a portion of the optical probe as described by line A—A' in FIG. 2, as well as the response curves produced by the separate light receiving bundles and the output curve derived from the two response curves according to the present invention.

Referring now to FIG. 3, there is shown a graph of the response curves generated as a result of reflected light which is received by the first 16 and second 20 pluralities of light receiving fibers. Curve X shows the response curve generated by light received through the first plurality of light receiving fibers 16, while curve Y depicts the response curve generated by light received through the second plurality of light receiving fibers 20. As target A is displaced from the end of probe 10, the light reflected from the target covers a progressively greater area of the surface of the probe 10. As a result, curve X shows that the amount of reflected light received by the first plurality 16 approaches a peak when the target is at a distance sufficient to reflect light to all fibers within the first plurality 16 but none with the second plurality 20. Similarly, curve Y demonstrates that as the target A grows progressively more distant, light is reflected on progressively more fibers within the second plurality until a peak is reached. Curve X decreases through this region since the emitted light from light emitting fibers 12 is dispersed over a greater area with increasing distance and therefore provides a lower total amount of light to the first plurality 16. FIG. 3 shows the output curve Z generated by dividing the values obtained in curve Y by those obtained from curve X in the analog divider 38. Note particularly the broad region of linearity indicated in bolded detail. Within this region, measurement error of target displacement is less than 1%.

The schematic representation of the tip of probe 10 in FIG. 3 shows how the response curves X and Y are a direct product of the geometry of the optical fibers. In the first target position B, a cone of emitted light 40 strikes the target and is reflected back to a portion of the light receiving fibers in the first region 22. This corresponds to a point on curve X between the beginning of the response and peak response. As the target moves to position B', some of the light receiving fibers of the second region 22 are illuminated, producing response as shown on response curve Y. At the same time all of the fibers in the first plurality are illuminated and give a peak response. As the target continues to grow distant the numbers of optical fibers in the second region 22 which are illuminated continue to grow, as does the response value, as shown at position B''. However, although all the fibers of the first region 18 remain illuminated, the response curve falls off due to the intensity of the reflected light is decreasing as a square of the distance.

It should be noted that the numerical aperture of the fibers will determine the maximum half angle of the cone of light emerging from the light emitting fibers and a similar cone of acceptance for the light receiving fibers. However, if the source light enters the light emitting fibers at a smaller angle than that determined by the numerical aperture, then the emitter output cone of light will be correspondingly smaller.

The analog divider 38 takes the quotient of the values represented by curves X and Y, thereby producing a voltage output that is substantially independent of differential target reflection, source light variations and input power variations. This is because the geometry of the system is fixed. That is, in the preferred embodiment of the present invention the diameter of each of the three regions, the ratios of the diameters and the numerical apertures of the fibers remain constant. When a ratio of the individual values $S_1$ and $S_2$ is taken, any error or noise due to the physical characteristics of the system is reduced.

In another embodiment of this invention, two probe sensors of the type described above can be utilized to increase the linearity of the output and thus measurement accuracy over a broader range of displacement. In this embodiment, the two probes are positioned substantially opposite a target, with the probes facing each other. Each of the probes is configured and constructed as described in the preferred embodiment above and is separately attached to its own output generating circuitry. Operation of the probes proceeds as described above, recognizing that as the target moves toward one probe, it moves an equivalent distance away from the other probe.

Data collected from this two probe system is processed by taking the inverse of the output from either probe and summing it with the output of the other probe. In this way, an enhanced output can be generated with a linear range roughly twice that of a single probe system.

EXAMPLE 1

Figure 4:
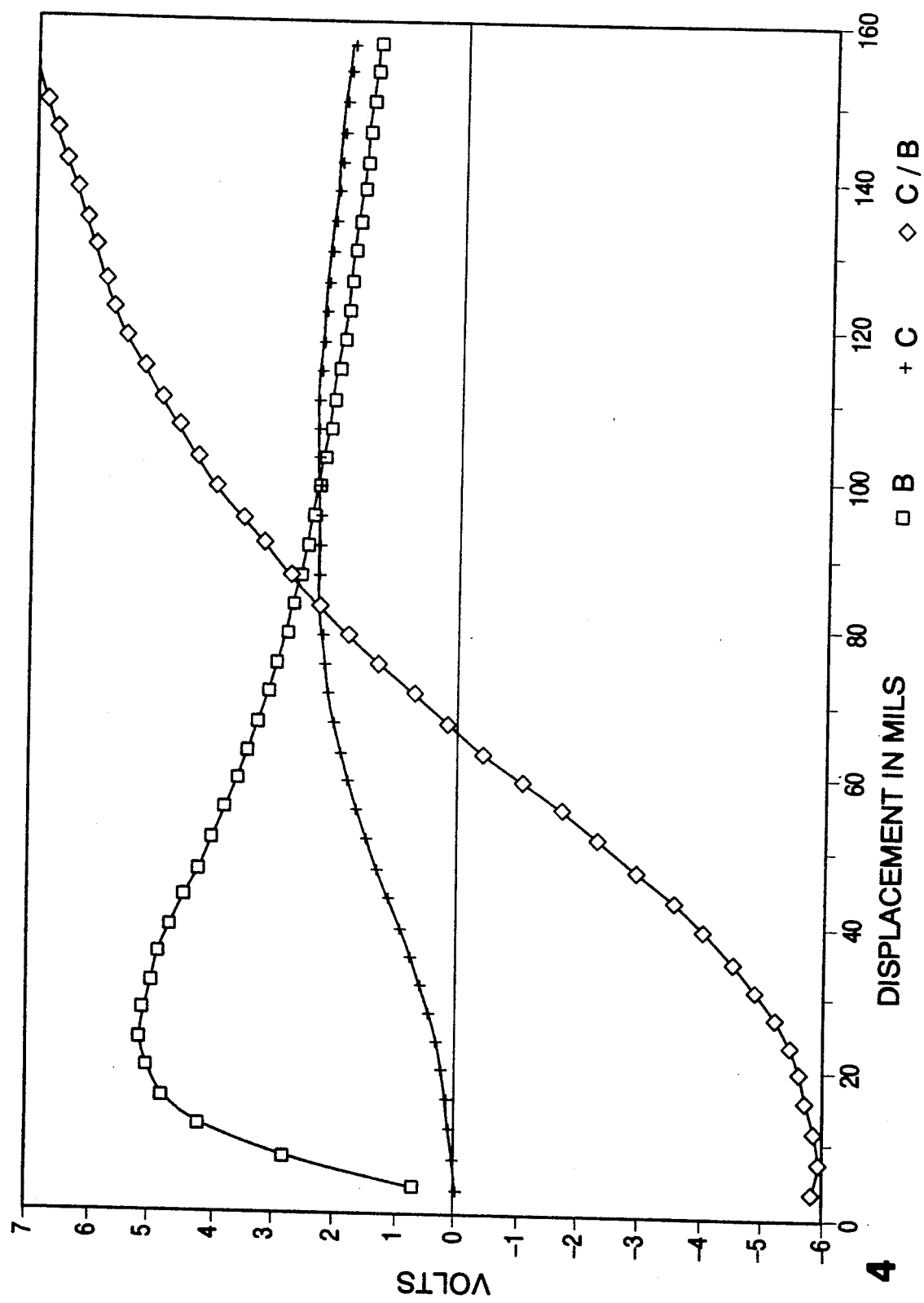
FIG. 4 shows the response curves and output curve generated using the preferred embodiment of the present invention with a mirrored surface as target.

A probe and circuitry according to the preferred embodiment described above were constructed for the purpose of ascertaining probe range, sensitivity and accuracy. The diameter of the probe, as measured from points along the outermost optical fibers was 0.056 inch. The diameter of the central region was 0.020 inch. The width of the first exterior region was 0.011 inch while the width of the second exterior region was 0.016 inch. The width of both ferrules was 0.006 inch. The optical fiber diameter of both light emitting and light receiving fibers was 2.7 mils. The total number of light emitting optical fibers in the central region was 35. The total number of light receiving fibers in the first exterior region was 150, while the total number of light receiving fibers in the second external region was 474. The light source was an LED generating infrared light in the range of 10 milliwats. The displacement results using a mirrored target are shown in FIG. 4a. Note in this case the ratio taken was the voltage response generated by the second exterior region divided by the voltage response generated by the first exterior region. A total range of 160 mils of displacement was measurable. A region of substantial linearity, as defined by an error rate of ±1% or less in measurement, is seen over a range of approximately 47 mils.

EXAMPLE 2

A probe and apparatus of the same construction and specifications as used in Example 1 was employed to measure displacement of a target made of paper. The results of such measurements are shown in FIG. 4b. Note that although paper has a substantially lower and more diffusely reflective surface, the apparatus of the preferred embodiment had a linear range of measurement of approximately 41 mils.

EXAMPLE 3

A probe and apparatus of the same construction and specifications as used in Example 1 was employed to measure displacement of a target comprised of an actuator coil. The results of such measurements are shown in FIG. 4c. Note that although coil has an irregularly reflective surface, the apparatus of the preferred embodiment achieved a linear range of measurement on the order of 48 mils.

EXAMPLE 4

A probe and apparatus of the same construction and specifications as used in Example 1 was employed to test the effects of variations in light source output. In this example, the LED infrared light source was adjusted to provide approximately 25% less light than in Example 1. Although the graph demonstrates marked error in the $S_1$ and $S_2$ response signals generated by the individual, the error in the final output generated by rationing the two responses throughout the effective measuring range was less than 1%.

EXAMPLE 5

Figure 5:
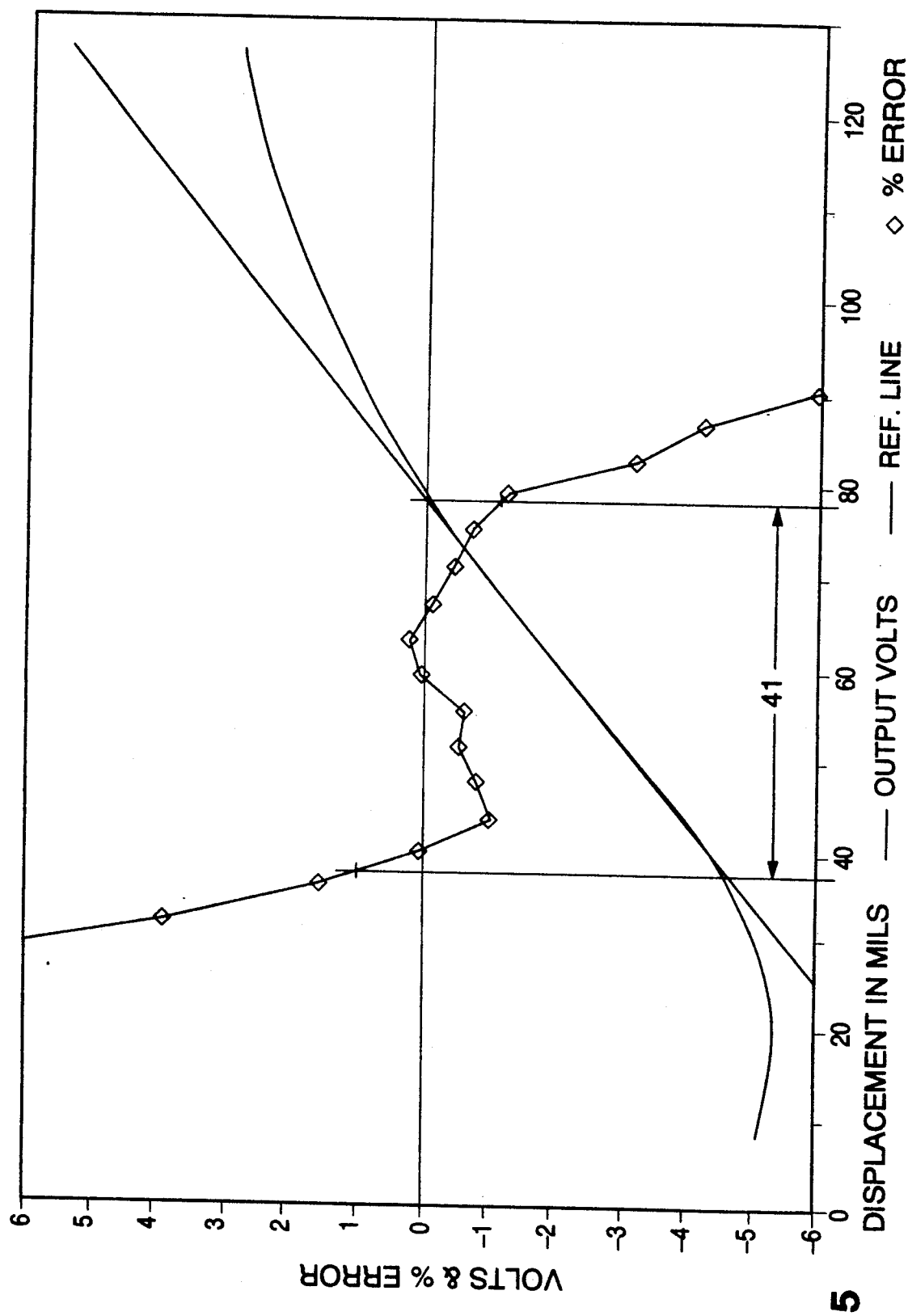
FIG. 5 shows the response curves and output curve generated using the preferred embodiment of the present invention with a paper surface as target.

A probe and apparatus of the same specifications as described in Example 1 was constructed, except that the relative positions of light emitting to light receiving fibers were changed. In this example, the optical fibers of the central region A were configured to receive light, while fibers of the first exterior region B were configured to emit light. Fibers of the second exterior region C remained light receiving. The results of a test using a target with a mirrored surface are given in FIG. 5. Note that the region of linearity is not as great as in Example 1.

EXAMPLE 6

Figure 6:
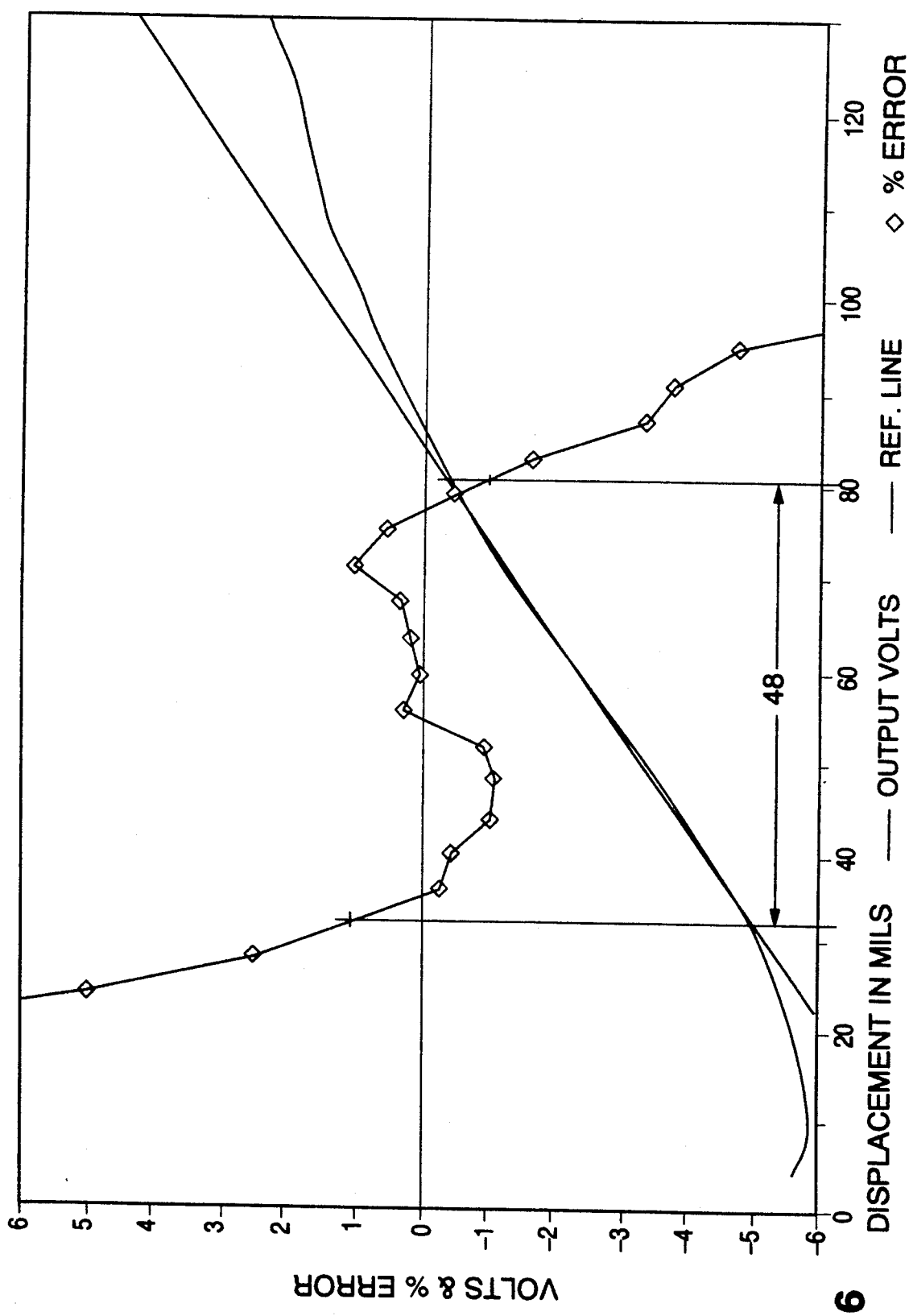
FIG. 6 shows the response curves and output curve generated using the preferred embodiment of the present invention with an actuator coil as target.
Figure 7:
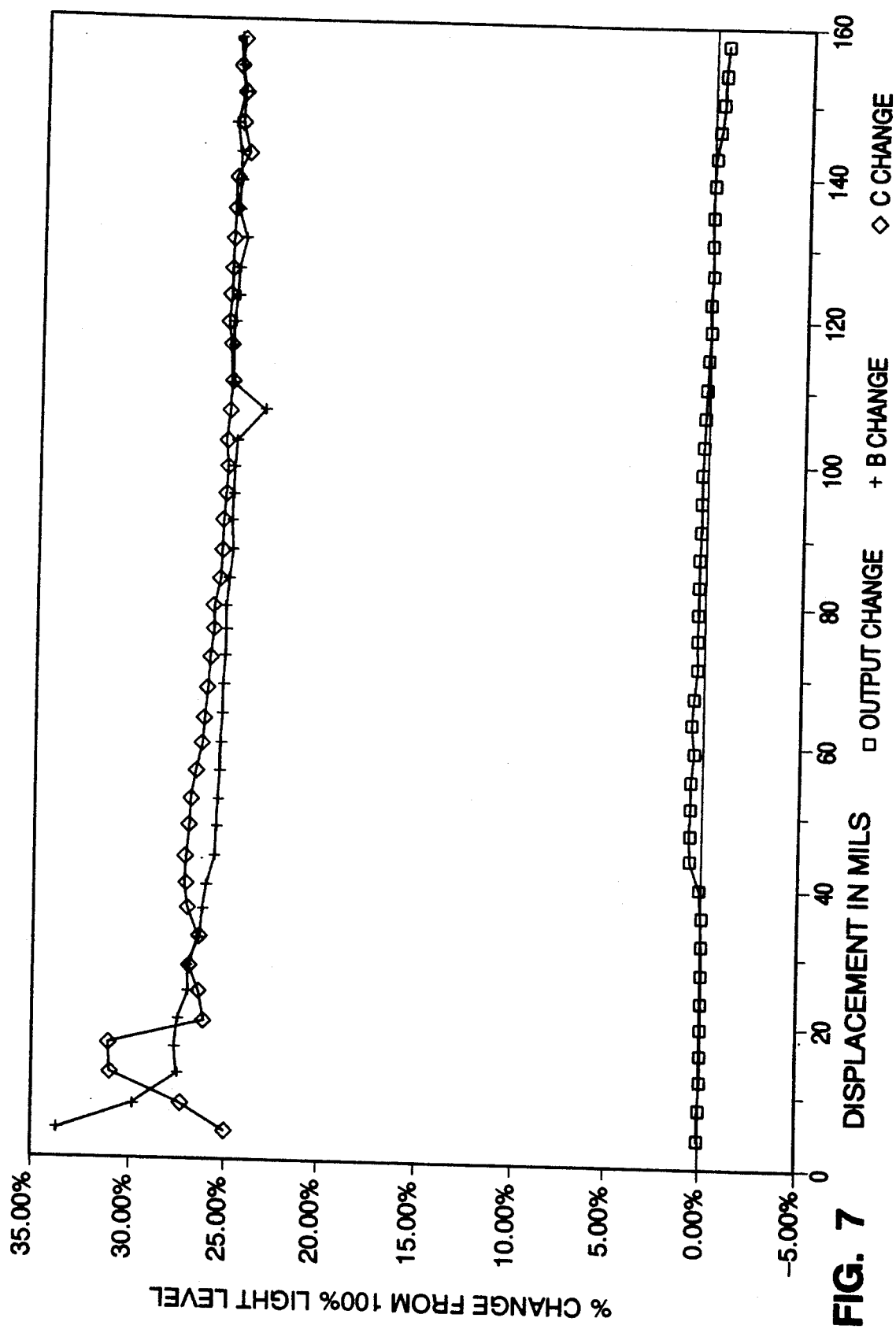
FIG. 7 shows the error in output in response to changes in the light levels received from the target.

A probe and apparatus of the same specifications as described in Example 1 was constructed, except that the relative positions of light emitting to light receiving fibers were changed. In this example, the optical fibers of the central region A were configured to receive light, while fibers of the second exterior region C were configured to emit light. Fibers of the first exterior region B remained light receiving. The results of a test using a target with a mirrored surface are given in FIG. 6. Note that the region of linearity is not as great as in Example 1.

EXAMPLE 7

Figure 8:
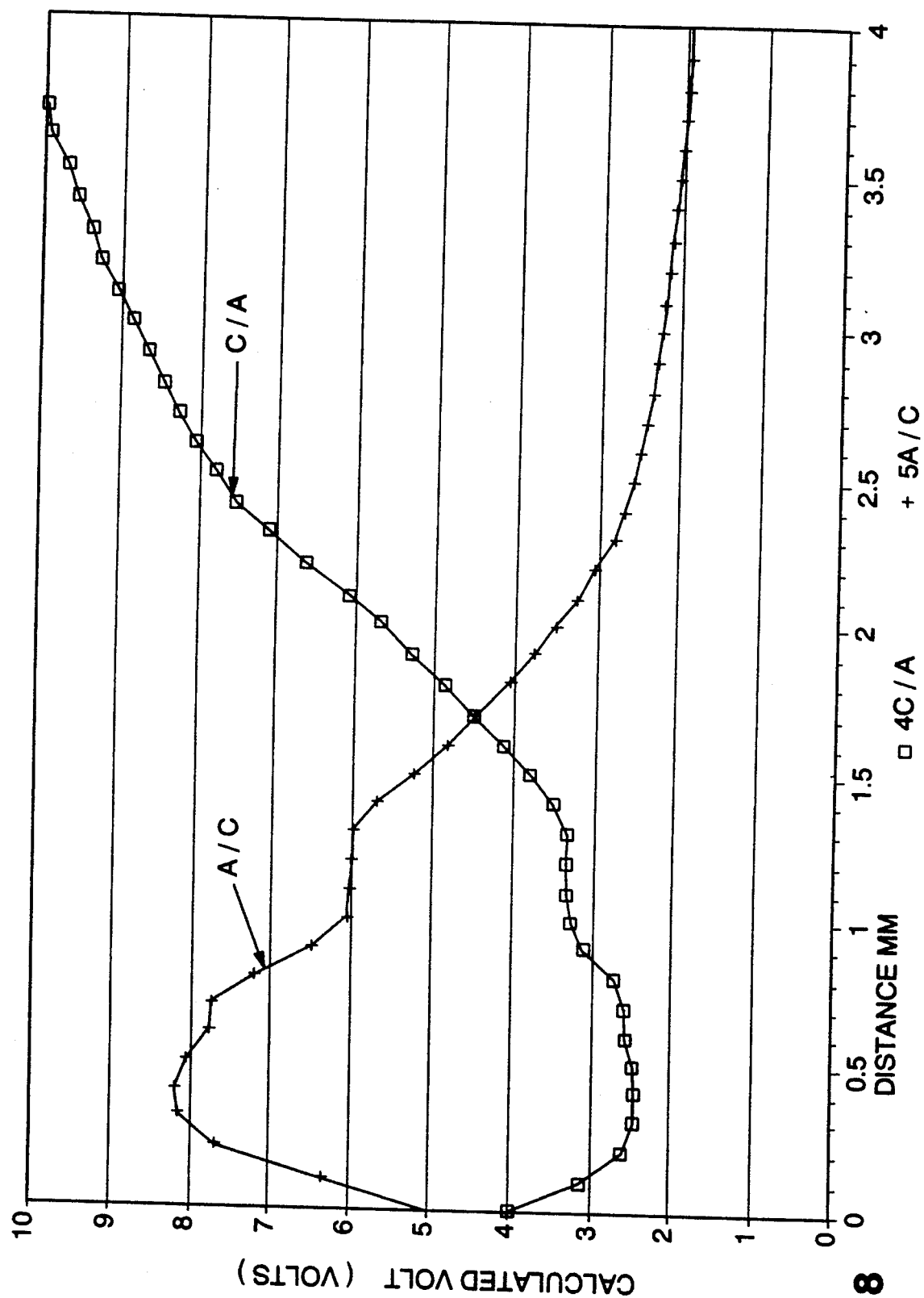
FIG. 8 shows the output curve generated according to a second embodiment of the present invention.
Figure 9:
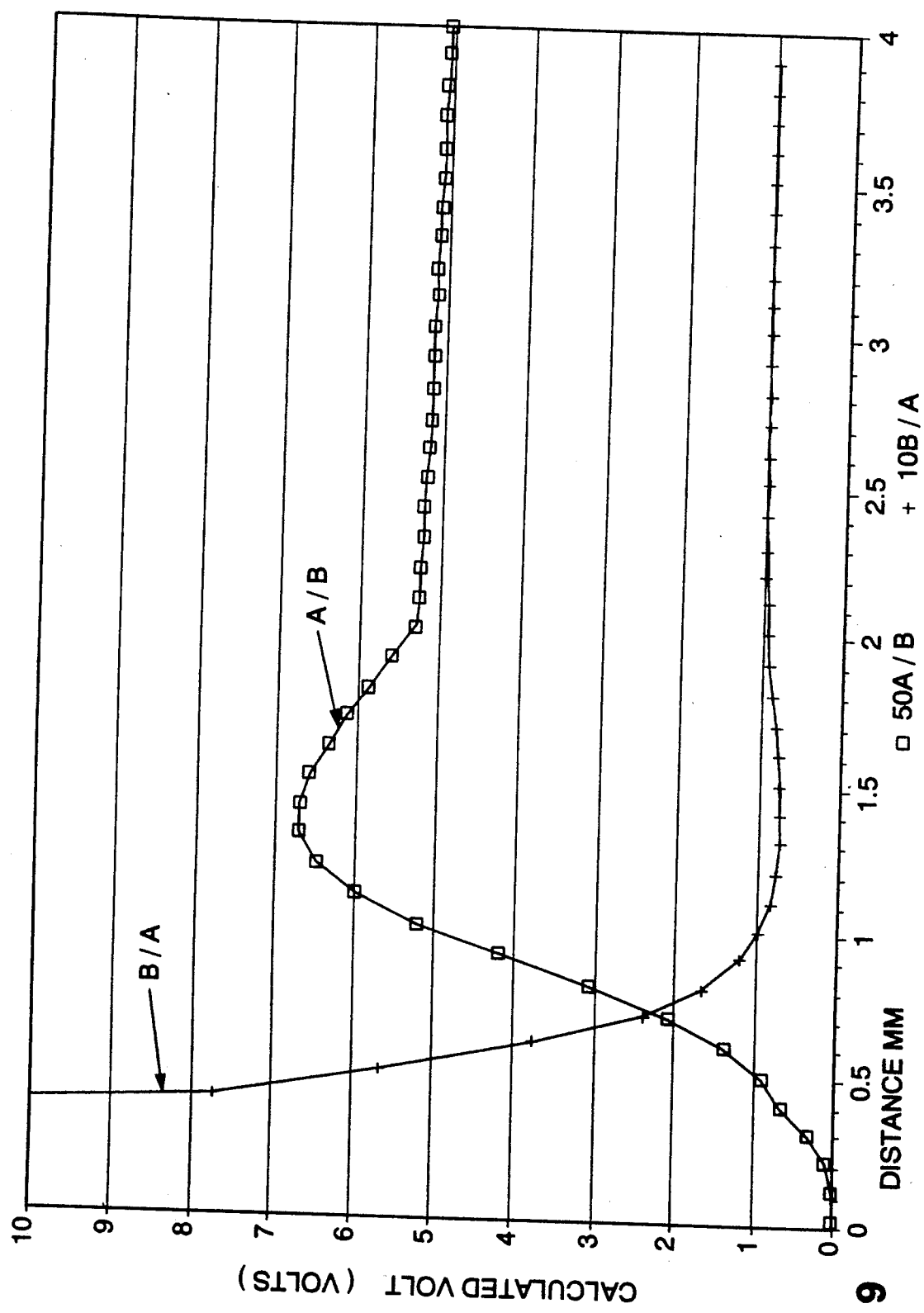
FIG. 9 shows the output curve generated according to a third embodiment of the present invention.
Figure 10:
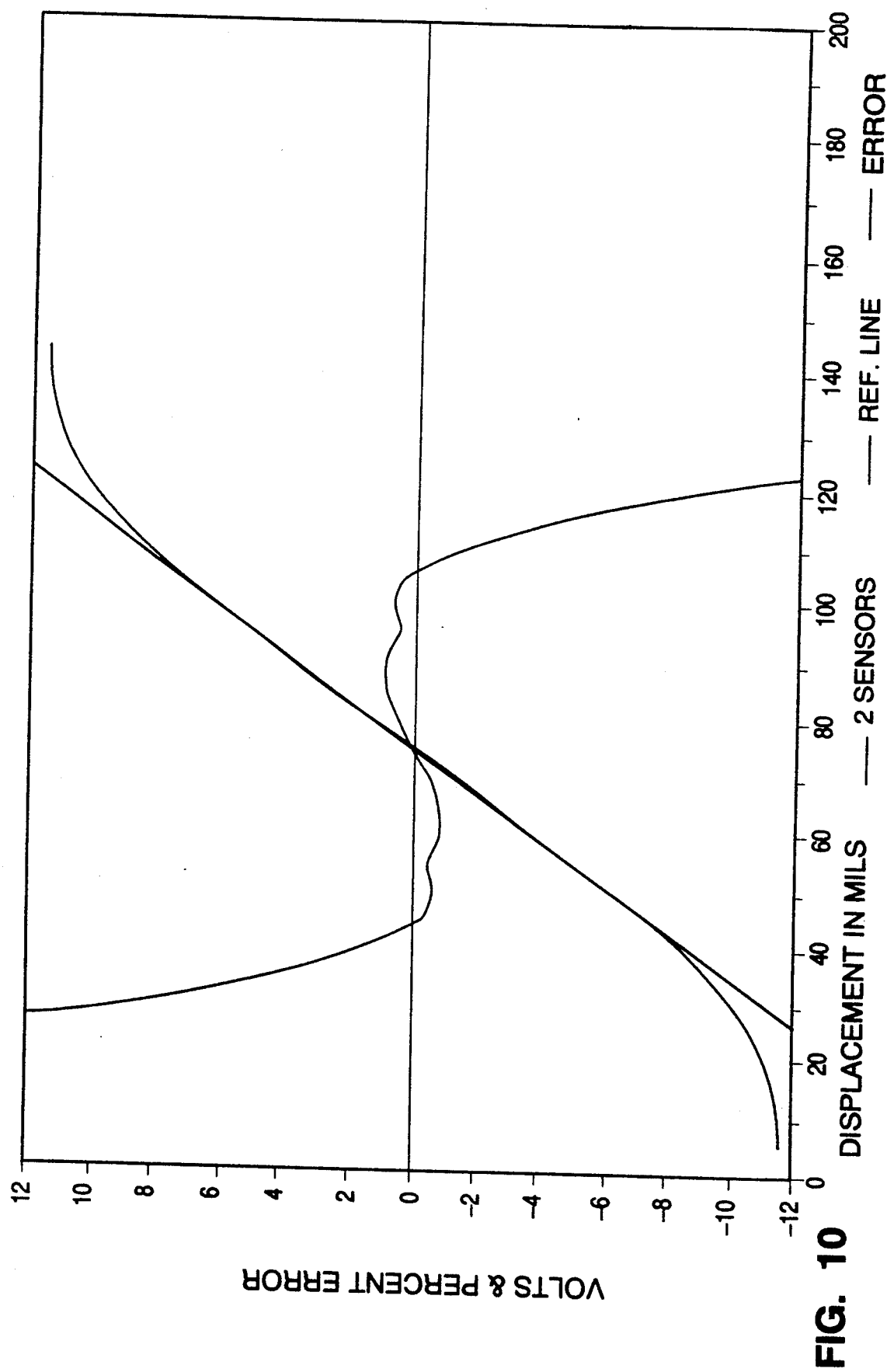
FIG. 10 shows the output curve generated according to an embodiment of the present invention using two optical probes.

A double probe embodiment as described above was constructed to ascertain probe sensitivity and accuracy in measuring displacement of an actuator coil. Each of the two probes was constructed according to the same specifications as used in Example 1. The results of these measurements are given in FIG. 8. Note that the linear range of measurement is approximately 75 mils, roughly twice the range achieved with the single probe systems described above.

It is now apparent that the fiber optic probe sensor of the present invention, as described and illustrated above, shows many marked improvements over available probe sensors. It is to be understood, however, that although certain preferred embodiments have been disclosed and described above, other embodiments and changes are possible without departing from that which is the invention disclosed herein. It is intended therefore that the following claims define the invention, and that the structure within the scope of these claims and their equivalents be covered thereby.

I claim:

1. An apparatus for determining displacement of a target of a type which emits light onto and receives light reflected from a target, the apparatus comprising:
   a. a plurality of light emitting fibers exclusively occupying a first region and capable of transmitting light from a light source and emitting the transmitted light onto a target so that the emitted light is reflected from the target;
   b. a first plurality of light receiving fibers exclusively occupying a second region, said first plurality of light receiving fibers spaced apart from said plurality of light emitting fibers at a distance $D_1$ and capable of receiving light reflected from the target and transmitting the received light;
   c. a second plurality of light receiving fibers exclusively occupying a third region, said second plurality of light receiving fibers spaced apart from said light emitting fibers at a distance $D_2$ so that $D_2$ is not equal to $D_1$ and capable of receiving light reflected from the target and transmitting the received light;
   d. means responsive to the transmitted light from the first and second pluralities of light receiving fibers, the transmitted light having a first and a second intensity respectively, for generating an output derived from a ratio of the first and second intensities.

2. The apparatus of claim 1 wherein the receiving and generating means comprise:
   a. a first light sensor coupled solely to said first plurality of light receiving fibers and capable of generating a first signal having a first value $S_1$ corresponding to the intensity of light received by said first sensor;
   b. a second light sensor coupled solely to said second plurality of light receiving fibers and capable of generating a second signal having a second value $S_2$ corresponding to the intensity of light received by said second sensor;
   c. signal processing means coupled to said first and second light sensors for generating an output derived from a ratio of the values of the first and second signals.

3. The apparatus of claim 2 wherein the signal processing means generates an output in accordance with the formula:

$$O = S_2/S_1,$$

where $S_2$ equals the second signal and $S_1$ equals the first signal.

4. The apparatus of claim 3 wherein the diameters of each of said light emitting and light receiving fibers is less than 1.5 mils in diameter.

5. The apparatus of claim 4 wherein said first, second and third regions together in cross-section comprise a disk which has a diameter X and lies at a distance $D_3$ from the target, the diameter X being substantially equal to the distance $D_3$.

6. An apparatus for determining displacement of a target of a type which emits light onto and receives light reflected from a target, the apparatus comprising:
   a. a plurality of light emitting fibers exclusively occupying a first region and capable of transmitting light from a light source and emitting the transmitted light onto a target so that the emitted light is reflected from the target;
   b. a first plurality of light receiving fibers exclusively occupying a second region, said first plurality of light receiving fibers spaced apart from said plurality of light emitting fibers at a distance $D_1$ and capable of receiving light reflected from the target and transmitting the received light;
   c. a first light sensor coupled solely to said first plurality of light receiving fibers and capable of generating a first signal having a first value $S_1$ corresponding to the intensity of light received by said first sensor;
   d. a second plurality of light receiving fibers exclusively occupying a third region, said second plurality of light receiving fibers spaced apart from said light emitting fibers at a distance $D_2$ so that $D_2$ is not equal to $D_1$ and capable of receiving light reflected by the target and transmitting the received light;
   e. a second light sensor coupled solely to said second plurality of light receiving fibers and capable of generating a second signal having a second value $S_2$ corresponding to the intensity of light received by said second sensor;
   f. a signal processing means coupled to said first and second light sensors and capable of generating an output in accordance with the formula:

$$O = S_2/S_1,$$

where $S_2$ equals the second signal and $S_1$ equals the first signal.

7. An apparatus for determining displacement of a target of a type which emits light onto and receives light reflected from a target, the apparatus comprising:
   a. a plurality of light emitting fibers exclusively occupying a first region and capable of transmitting light from a light source and emitting the transmitted light onto a target so that the emitted light is reflected from the target;
   b. a first plurality of light receiving fibers concentrically arrayed in a second region exterior to said first zone and capable of receiving light reflected from the target and transmitting the received light;

c. a second plurality of light receiving fibers concentrically arrayed in a third region exterior to said second region and capable of receiving light reflected by the target and transmitting the received light;

d. means responsive to the transmitted light from the first and second pluralities of light receiving fibers, the transmitted light having a first and a second intensity respectively, for generating an output derived from a ratio of the first and second intensities.

8. The apparatus of claim 7 wherein the receiving and generating means comprises:

a. a first light sensor coupled solely to said first plurality of light receiving fibers and capable of generating a first signal having a first value $S_1$ corresponding to the intensity of light received by said first sensor;

b. a second light sensor coupled solely to said second plurality of light receiving fibers and capable of generating a second signal having a second value $S_2$ corresponding to the intensity of light received by said second sensor;

c. signal processing means coupled to said first and second light sensors for generating an output derived from a ratio of the values of the first and second signals.

9. The apparatus of claim 8 wherein the said signal processing means generates an output in accordance with the formula:

$$O = S_2/S_1$$

where $S_2$ equals the second signal and $S_1$ equals the first signal.

10. The apparatus of claim 9 wherein the diameters of each of said light emitting and light receiving fibers is less than 1.5 mils in diameter.

11. The apparatus of claim 10 wherein said first, second and third regions together in cross-section comprise a disk which has a diameter X and lies at a distance $D_3$ from the target, the diameter X being substantially equal to the distance $D_3$.

12. An apparatus for determining displacement of a target of a type which emits light onto and receives light reflected from a target, the apparatus comprising:

a. a first plurality of light receiving fibers exclusively occupying a first region and capable of receiving light reflected from a target and transmitting the received light;

b. a first light sensor coupled solely to said first plurality of light receiving fibers and capable of generating a first signal having a first value $S_1$ corresponding to the quantity of light received by said first sensor;

c. a second plurality of light receiving fibers concentrically arrayed in and exclusively occupying a second region exterior to said first region and capable of receiving light reflected by the target and transmitting the received light;

d. a second light sensor coupled solely to said second plurality of light receiving fibers and capable of generating a second signal having a value $S_2$ corresponding to the quantity of light received by said second sensor;

e. a plurality of light emitting fibers concentrically arrayed in and exclusively occupying a third region exterior to said second region and capable of transmitting light from a light source and emitting the transmitted light onto the target so that the emitted light is reflected from the target;

f. signal processing means coupled to said first and second light sensors and capable of generating an output derived from a ratio of the values of the first and second signals.

13. The apparatus of claim 12 wherein the said signal processing means generates an output in accordance with the formula:

$$O = S_2/S_1$$

where $S_2$ equals the second signal and $S_1$ equals the first signal.

14. The apparatus of claim 13 wherein the diameters of each of said light emitting and light receiving fibers is configured to be less than 1.5 mils in diameter.

15. The apparatus of claim 14 wherein said first, second and third regions together in cross-section comprise a disk which has a diameter X and lies at a distance $D_3$ from the target, the diameter X being substantially equal to the distance $D_3$.

16. An apparatus for determining displacement of a target of a type which emits light onto and receives light reflected from a target, the apparatus comprising:

a. a central bundle of light emitting fibers exclusively occupying a first region which is substantially circular in cross-section and capable of transmitting light from a light source and emitting the transmitted light onto a target so that the emitted light is reflected from the target;

b. a first sheath of light receiving fibers positioned exterior to said bundle and separated from said bundle by a first gap, said light receiving fibers capable of receiving light reflected from the target and transmitting the received light;

c. a second sheath of light receiving fibers positioned exteriorly of said first sheath and separated from said first sheath by a second gap, said light receiving fibers capable of receiving light reflected by the target and transmitting the received light;

d. a first light sensor coupled solely to said first plurality of light receiving fibers and capable of generating a first signal having a value of $S_1$ corresponding to the quantity of light received by said first sensor;

e. a second light sensor coupled solely to said second plurality of light receiving fibers and capable of generating a second signal having a value of $S_2$ corresponding to the quantity of light received by said second sensor;

f. signal processing means coupled to said first and second light sensors and capable of generating an output derived from a ratio between the values of the first and second signals.

17. The apparatus of claim 16 wherein said signal processing means generates an output in accordance with the formula:

$$O = S_2/S_1$$

where $S_2$ equals the second signal and $S_1$ equals the first signal.

18. The apparatus of claim 17 wherein the diameters of each of said light emitting and light receiving fibers is less than 1.5 mils in diameter.

19. The apparatus of claim 18 wherein said central bundle and said first and second sheaths together in cross-section comprise a disk which has a diameter X and lies at a distance $D_3$ from the target, the diameter X being substantially equal to the distance $D_3$.

20. An apparatus for determining displacement of a target of a type which emits light onto and receives light reflected from a target, the apparatus comprising:
 a. a central bundle of light emitting fibers exclusively occupying a first region which is substantially circular in cross-section and capable of transmitting light from a light source and emitting the transmitted light onto the target so that the emitted light is reflected from the target;
 b. a first sheath of light receiving fibers positioned exterior to said bundle and separated from said bundle by a first gap, said light receiving fibers capable of receiving light reflected from the target and transmitting the received light;
 c. a second sheath of light receiving fibers positioned exteriorly of said first sheath and separated from said first sheath by a second gap, said light receiving fibers capable of receiving light reflected by the target and transmitting the received light;
 d. a first light sensor coupled solely to said first plurality of light receiving fibers and capable of generating a first signal having a value of $S_1$ corresponding to the quantity of light received by said first sensor;
 e. a second light sensor coupled solely to said second plurality of light receiving fibers and capable of generating a second signal having a value of $S_2$ corresponding to the quantity of light received by said second sensor;
 f. signal processing means coupled to said first and second light sensors and capable of generating an output in accordance with the formula:

$$O = S_2/S_1$$

where $S_2$ equals the second signal and $S_1$ equals the first signal,
wherein each of said light emitting and light receiving fibers has a diameter of less than 1.5 mils, and central bundle and said first and second sheaths together in cross-section comprise a disk which has a diameter X and lies at a distance $D_3$ from the target, the diameter X being substantially equal to the distance $D_3$.

21. A system for determining displacement of a target comprising:
 a. a first and a second fiber optic probe sensor, said sensors disposed opposite the target in a facing manner, each sensor comprising:
  (i) a plurality of light emitting fibers exclusively occupying a first region and capable of transmitting light from a light source and emitting the transmitted light onto the target so that the emitted light is reflected from the target;
  (ii) a first plurality of light receiving fibers exclusively occupying a second region, said first plurality of light receiving fibers spaced apart from said light emitting fibers by a distance $D_1$ and capable of receiving light reflected from the target and transmitting the received light;
  (iii) a second plurality of light receiving fibers exclusively occupying a second region, said second plurality of light receiving fibers spaced apart from said light emitting fibers at a distance $D_2$ so that $D_2$ is not equal to $D_1$ and capable of receiving light reflected by the target and transmitting the received light;
  (iv) means responsive to the transmitted light from the first and second pluralities of light receiving fibers, the transmitted light having a first and a second intensity respectively, for generating an output derived from a ratio of the first and second intensities; and
 b. means for first generating an inverse of the output of one of said sensors, and then for summing the inverse with the output of the other sensor.

22. A system for determining displacement of a target comprising:
 a. a first and a second fiber optic probe sensor, said sensors disposed opposite the target in a facing manner, each sensor comprising:
  (i) a plurality of light emitting fibers exclusively occupying a first region and capable of transmitting light from a light source and emitting the transmitted light onto a target so that the emitted light is reflected from the target;
  (ii) a first plurality of light receiving fibers concentrically arrayed in and exclusively occupying a second region exterior to said first region;
  (iii) a first light sensor coupled solely to said first plurality of light receiving fibers and capable of generating a first signal having a first value $S_1$ corresponding to the quantity of light received by said first sensor;
  (iv) a second plurality of light receiving fibers concentrically arrayed in and exclusively occupying a third region exterior to said second region and capable of receiving light reflected by the target and transmitting the received light;
  (v) a second light sensor coupled solely to said second plurality of light receiving fibers and capable of generating a second signal having a value $S_2$ corresponding to the quantity of light received by said second sensor;
  (vi) signal processing means coupled to said first and second light sensors and capable of generating an output derived from a ratio of the values of the first and second signals; and
 b. means for first generating an inverse of the output of one of said sensors, and then for summing the inverse with the output of the other sensor.

23. The apparatus of claim 22 wherein the said signal processing means generates an output in accordance with the formula:

$$O = S_2/S_1$$

where $S_2$ equals the second signal and $S_1$ equals the first signal.

24. The apparatus of claim 23 wherein the diameters of each of said light emitting and light receiving fibers is less than 1.5 mils in diameter.

25. The apparatus of claim 24 wherein said first, second and third regions together in cross-section comprise a disk which has a diameter X and lies at a distance $D_3$ from the target, the diameter X being substantially equal to the distance $D_3$.

* * * * *